Jan. 4, 1966  R. F. WICK  3,227,960
MULTISTAGE HALL-EFFECT DEVICES
Filed Sept. 26, 1961  3 Sheets-Sheet 1
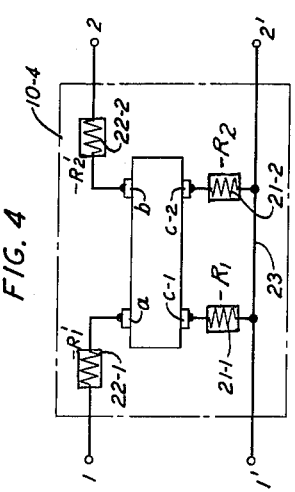
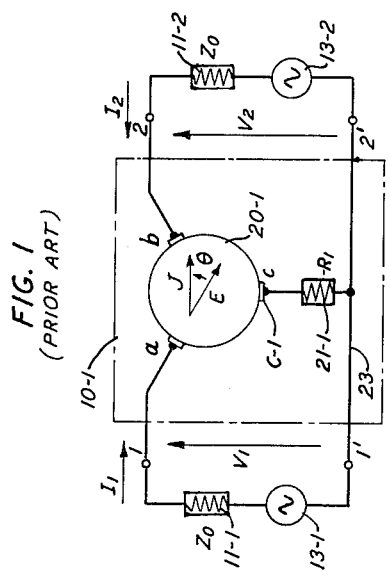
INVENTOR
R. F. WICK
BY
Harry C. Hart
ATTORNEY

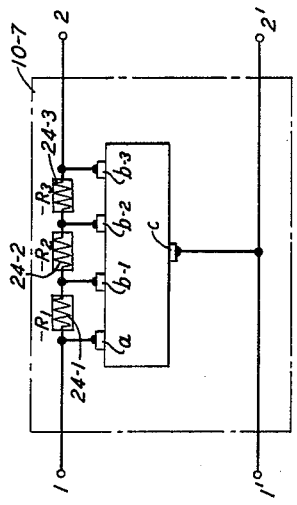
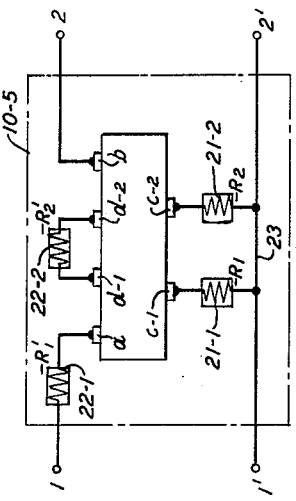
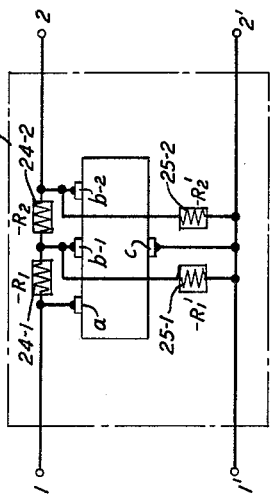
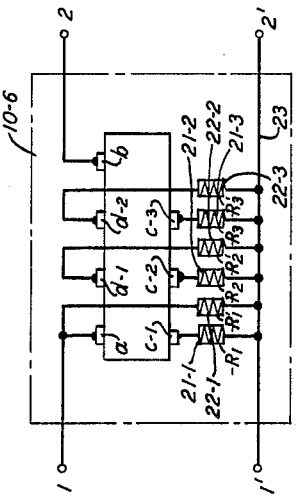

Jan. 4, 1966  R. F. WICK  3,227,960
MULTISTAGE HALL-EFFECT DEVICES
Filed Sept. 26, 1961  3 Sheets-Sheet 3

INVENTOR
R. F. WICK
BY
Harry C. Hart
ATTORNEY

United States Patent Office 3,227,960
Patented Jan. 4, 1966

3,227,960
MULTISTAGE HALL-EFFECT DEVICES
Ronald F. Wick, Long Valley, N.J., assignor to Bell Telephone Laboratories, Incorporated, New York, N.Y., a corporation of New York
Filed Sept. 26, 1961, Ser. No. 140,768
10 Claims. (Cl. 330—6)

This invention relates to Hall-effect devices employing negative resistance and more particularly to the multistage realization of such devices with but a single body of Hall material.

Certain Hall devices rely upon the complementary characteristics of Hall materials and negative resistance elements. When a body of Hall material is appropriately positioned in a magnetic field, it attenuates oppositely propagating signals unequally. On the other hand, a negative resistance element is able to cancel positive resistance, but it does so without regard to propagation direction. Hence, a combination device is able to provide varying degrees of directionality, with or without amplification.

For complete directionality or isolation, there is a transmission null in one direction of propagation. This null is often attained by the adjustment of negative resistance in a single-stage device. Then, however, magnitude variations of the negative resistance cause departures from the null. Although the departures can be mitigated by the tandem connection of numerous stages, that arrangement requires an additional body of Hall material for each added stage and sacrifices structural compactness.

Consequently, it is an object of the invention to counteract variations in the degree of directional signal propagation in a combination device employing but a single body of Hall material. A related object is to maintain, in a single-body Hall device, a substantial null to signal transmission in one direction of propagation despite variations in negative resistance.

From the standpoint of amplification, the gain of a single-body combination device is at a maximum when its negative resistance is adjusted to cancel the totality of positive resistance in a desired direction of propagation. Unfortunately, with a close adjustment the negative resistance may become dominant and cause spontaneous oscillations. This kind of instability is countered, without reducing gain, by limiting the gain per stage and increasing the number of stages.

It is a further object of the invention to obtain in a combination device, the desired increase in the number of stages without resort to the tandem connection of numerous single-stage Hall devices. A concurrent object is to enhance the stability of a single-body Hall device.

Where the gain-producing negative resistance in a combination device is simultaneously responsible for isolation as well, the resistive magnitude must be critically adjusted. And it is a yet further object of the invention to reduce the criticality of this adjustment. A further object is to obtain enhanced gain and isolation in a combination device requiring but a single body of Hall material.

In accomplishing the foregoing and related objects the invention achieves multistage signal processing, with but a single body of Hall material, by iterating at least one negative impedance element of a single-stage Hall device. For each iteration the single-stage device is, in effect, augmented by an additional stage.

With one kind of multistage amplifier, displaying a low magnitude input impedance and derived from a single-stage device including a negative resistance element interconnecting a common terminal with a region of a Hall plate, the effect of an additional stage is obtained for each supplementary negative resistance element that interconnects a different region of the plate with the common terminal. Thus, the iterated negative resistance elements are connected in parallel through the Hall plate.

To obtain the second kind of multistage amplifier, displaying a high magnitude input impedance, the iterated negative resistance elements are connected in series, instead of in parallel. With either kind of amplifier, additional negative resistance elements can be employed per stage to reduce the stringency of the requirements on the resistive magnitudes of the negative elements.

Other single-body devices, according to the invention, permit unidirectional transmission among restricted pairs of terminals, or ports. In a duplexer, where transmission among the ports is permitted only between first and second ports and between second and third ports, a negative resistance element providing phase-reversal cancels the unidirectional through-transmission permitted by two other negative resistance elements.

It is a feature of the invention that the various multistage devices have a common input and output terminal.

In keeping with a further feature of the invention the multistage devices are insensitive to one or more of their terminations.

Still other features of the invention will become apparent after the consideration of several illustrative embodiments taken in conjunction with the drawings, in which:

FIG. 1 is a circuit diagram including a single-stage Hall amplifier employing a single negative resistance element;

FIG. 2 is a schematic diagram of a dual-stage Hall amplifier employing a single Hall plate;

FIG. 3 is a generalized diagram of the Hall amplifier shown in FIG. 2;

FIGS. 4 through 6 are schematic diagrams of multistage Hall amplifiers derivable from the Hall amplifier of FIG. 3;

FIG. 7 is a schematic diagram of a second variety of multistage Hall amplifier, according to the invention;

FIG. 8 is a schematic diagram of a multistage Hall amplifier derived from the amplifier of FIG. 7;

Figure 9:
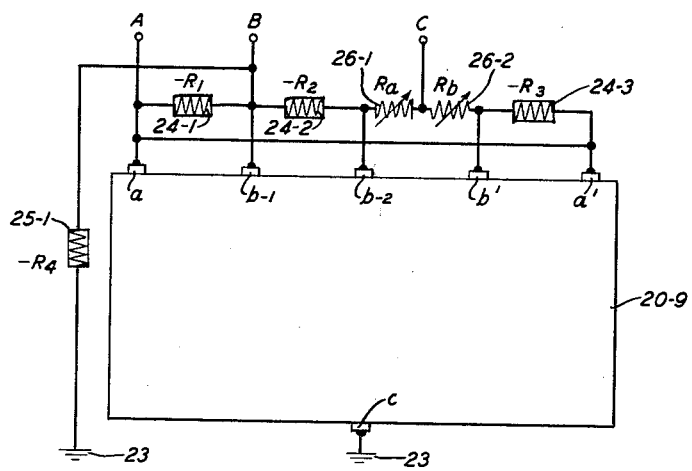
FIG. 9 is a schematic diagram of a Hall-effect duplexer employing but a single body of Hall material.

Turn now to FIG. 1, showing a single-stage Hall device taking the form of a four-terminal network 10–1 that is interposed between terminating resistors 11–1 and 11–2. Accompanying the resistors are respective voltage sources 13–1 and 13–2 which are separately operable, depending upon whether information signals are to propagate from the left-hand terminals 1 and 1' or from the right-hand terminals 2 and 2'.

Constituting the Hall device of the network 10–1 are a three-electrode semiconductive plate 20–1 and a negative resistance element 21–1. The latter interconnects one electrode c–1 with a link 23 joining one input terminal 1' with one output terminal 2' and maintaining the terminals 1' and 2' at a common potential. The other electrodes a and b are separately connected to the remaining input and output terminals 1 and 2, respectively. While the plate 20–1 is shown to be circular with equispaced edge electrodes a, b and c–1, any arbitrary shape will suffice so long as it is simply connected in the mathematical sense. The spacings and dimensions of the electrodes a, b and c–1 are arbitrary.

As is well known, the relationships among the currents $I_1$ and $I_2$ and voltages $V_1$ and $V_2$ of the four-terminal network 10–1 are described by Equation 1:

$$V_1 = Z_{11}I_1 + Z_{12}I_2$$
$$V_2 = Z_{21}I_1 + Z_{22}I_2 \qquad (1)$$

where $Z_{11}$ is the self-impedance measured at the left-hand pair of terminals 1–1', $Z_{12}$ is the transfer impedance from the left to right, $Z_{22}$ is the self-impedance measured at the right-hand pair of terminials 2–2' and $Z_{21}$ is the transfer impedance from right to left.

When a magnetic field is applied perpendicular to the principal faces of the plate 20–1, the respective vectors for the electric field E and the current density J are rotationally displaced from each other by a Hall angle $\theta$. As a result, the transfer impedances $Z_{12}$ and $Z_{21}$ are unequal and the network 10–1 is said to be nonreciprocal.

For the single-stage device of FIG. 1 a single negative impedance element 21–1 is able to provide both isolation and amplification, although, as demonstrated in Patent 2,794,864 issued to W. Shockley, two negative resistance elements are generally employed with a three-electrode Hall plate, one to provide zero transmission in a reverse direction and the other to provide amplification in a forward direction.

However, with a single negative impedance element its resistive magnetude $R_1$ must be critically adjusted. For a Hall plate 20 of indium antimonide subjected to a magnetic field intensity of 10,000 gauss ($\theta = 81°$), the critical magnitude is $-0.95$ ohm, normalized with respect to terminating resistors 11–1 and 11–2 having the same image impedance $Z_0$, and the gain from left to right is approximately ten decibels. Simultaneously there is a zero of transmission from right to left.

Because of the criticality of the resistive magnitude in the configuration of FIG. 1, raising the unidirectional gain from ten to 20 decibels would ordinarily require the addition of a tandem connected stage. The invention, however, is able to raise the gain by single iteration of the negative resistance element 21–1 in FIG. 1, resulting in the dual-stage amplifier of FIG. 2, where the iterated element 21–2 interconnects a supplementary electrode c–2 with the common link 23.

Although, as before, both the shape of the plate 20–2 and the configuration of the electrodes a, b and c are arbitrary, they, taken with the Hall angle $\theta$, influence the coefficients of the mesh Equations 2, which apply in the analysis of amplifier behavior.

$$V_a = A_{11}I_a + A_{12}I_b + A_{13}I_c$$
$$V_b = A_{21}I_a + A_{22}I_b + A_{23}I_c \qquad (2)$$
$$V_c = A_{31}I_a + A_{32}I_b + A_{33}I_c$$

where the voltages and the currents are as shown in FIG. 2.

Taken with the Kirchhoff relations of Equation 3, the formulations of Equation 2 are reducible to the form of Equation 1.

$$-V_b = R_2 I_c - R_1 I_b$$
$$I_2 = -(I_1 + I_b + I_c) \qquad (3)$$
$$V_1 = V_a + I_b R_1$$
$$-V_2 = V_c - I_c R_2$$

To obtain numeric values for the coefficients of Equation 2 measurements are made between adjoining electrodes or the procedure prescribed by R. F. Wick in 25 Jnl. of Applied Physics 745 (1954) at page 750 is followed. In the latter event the rectangular configuration of the Hall plate 20–2 (FIG. 2) is conformally mapped onto one-half of a complex plane and the electrodes a, b, c–1 and c–2 are positioned on the new boundaries. By further mapping into a parallelogram with fins as discussed on pages 746 of Wick (reference above), the coefficients for Equation 2 are readily obtained. When the Hall angle $\theta$ is 81 degrees, corresponding to a magnetic field of 10,000 gauss applied to an indium antimonide plate and the electrodes a, b, c–1 and c–2, as mapped, are equal in length and separated by the common length, the coefficients are given substantially by Table I:

Table I

| $A_{11} = -1.010$ | $A_{12} = 0.038$ | $A_{13} = 0.008$ |
| $A_{21} = -0.170$ | $A_{22} = -1.120$ | $A_{23} = 0.030$ |
| $A_{31} = -0.080$ | $A_{32} = -0.110$ | $A_{33} = -1.050$ |

Zero transmission from left to right and an optimum gain from right to left requires equal normalized magnitudes $R_1$ and $R_2$ of $-0.84$ ohm for the negative resistance elements 21–1 and 21–2. The corresponding power gain between image impedance terminations (not shown) is approximately 20 decibels, as desired.

For the network 10–2 of FIG. 2 consider the literal expressions for the various impedance expresisons of Equation 1 as the Hall angle $\theta$ approaches 90 degrees. The numerators of one transfer impedance $Z_{21}$ and the self-impedance $Z_{11}$ and $Z_{22}$ are given by the product of two factors $(Z_0 + R_1)$ and $(Z_0 + R_2)$. The numerator of other transfer impedance $Z_{12}$ is simply the product of the negative impedances $R_1$ and $R_2$. Of course, as the Hall angle $\theta$ is reduced from 90 degrees, the expressions are modified by distinctive and small magnitude constants.

For complete isolation there is a null in the transmission obtained by setting one transfer impedance $E_{21}$ to zero. Since there are two factors making up transfer impedance $Z_{21}$, there is a double null, making the performance of the device more predictable in the face of variations in negative resistances $R_1$ and $R_2$.

In a similar way the power gain G, as given by Equation 4

$$G = \frac{Z_0 Z_{12}^2}{Z_{11}(Z_0 + Z_{11})^2}$$

relies upon the product of two factors constituting the self-impedance $E_{11}$, again reducing the significance of variation in negative resistances $R_1$ and $R_2$.

Additionally the multistage device of FIG. 2 is less sensitive to its terminations since the terminal impedance $Z_0$ is additive in the denominator of Equation 4, rather than being substractive as where negative resistance is connected either in shunt or in series with a termination.

The enhancement in gain and isolation afforded by the addition of a single negative resistance element 21–2 can be increased indefinitely by continued iteration of the element 21–1 as shown in FIG. 3. In addition, the $n$-stage amplifier 10–3 of FIG. 3 has a supplementary negative resistance element 22–1 interconnecting adjoining electrodes a and c–1. Then the iterated elements 21–1 through 21–$n$ are gain-producing and the supplementary element 22–1 provides isolation. To the extent that the supplementary element 22–1 is also iterated, the isolation is enhanced and all of the resistive magnitudes made less stringent.

Thus, for each stage one of the elements can provide the zero transmission and the other provide the gain. On the basis of this principle an alternative amplifier 10–4 that is comparable with two tandem-connected stages, is shown in FIG. 4. While the amplifier 10–4 demonstrated in FIG. 4 is sensitive to its terminations, it can be made insensitive to a termination at its output terminals 2 and 2' by taking the form of the network 10–5 shown in FIG. 5. And a three-stage alternative to FIG. 5 is presented by the network 10–6 in FIG. 6.

Thus far, all of the multistage devices 10–2 through 10–6 have been characterized by resistive elements 21 which interconnect separate electrodes with a common link 23. Because of this "shunt" arrangement of iterated elements 21, the device has a low magnitude self-impedance. However, in a "series" arrangement of iterated elements 24, exemplified by the three-stage common electrode amplifier 10–7 of FIG. 7, the self-impedances are appreciable, facilitating the match of the device to certain terminations. Depending upon the adjustment of the elements 24, the common electrode amplified 10–7 can be given a phase-reversal characteristic. As before, the iterated elements 24–2 and 24–3 interconnect separate electrodes $b$–2 and $b$–3 with electrodes $b$–1 and $b$–2 respectively.

When two negative resistance elements 24 and 25 per stage are desirable in order to further reduce the magnitude requirements on the basic negative resistance elements 24, a suitable configuration is of the kind shown in FIG. 8. Even with the iterated pair of elements 24–2 and 25–2 removed, the amplifier 10–8 of FIG. 8 has a gain of 18 decibels for a Hall angle of 81 degreees.

Figure 11:
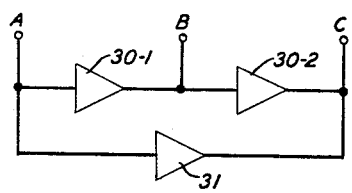
FIG. 11 is an explanatory circuit diagram for the duplexers of FIGS. 9 and 10.

Besides multistage amplifiers, the invention also comprehends multiport nonreciprocal circuit elements in general. One such element is the duplexer shown in FIG. 9, for which signal propagation occurs only between the first port A and the third port C and between the second port B and the third port C. This structure produces an effect somewhat similar to that obtained with the duplexer of FIG. 11 having two tandem amplifiers 30–1 and 30–2 connected in shunt with a phase-reversing amplifier 31. Each of the tandem-connected amplifiers 30–1 and 30–2 permits unilateral transmission through it, but any overall transmission is cancelled by the phase-reversing amplifier 31.

Figure 10:
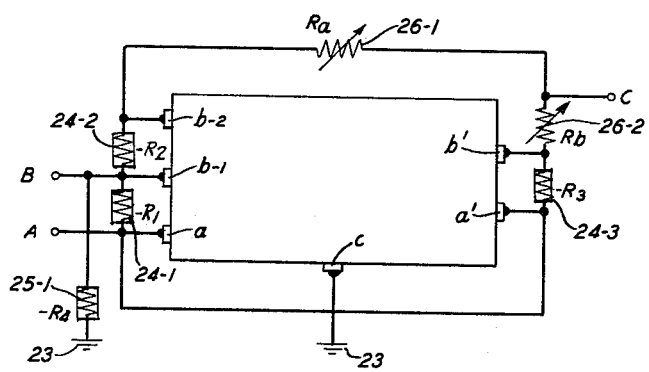
FIG. 10 is a schematic diagram of an alternative configuration for the duplexer of FIG. 9.

In FIG. 9 the upper left-hand portion of the plate 20–9 corresponds to a dual-stage version of the threestage amplifier 10–7 given in FIG. 7. Its negative impedance elements 24–1 and 24–2 are adjusted for ordinary unidirectional signal propagation from the first port A to the second port B and from the second port B to the third port C. Similarly, the right-hand portion is a single-stage amplifier, but its negative resistance element 24–3 is adjusted for phase-reversal to afford cancellation of any through-transmission from the first port A to the third port C. In order that back propagation from C to A be prevented, positive resistance elements 26–1 and 26–2 are included at the third port C and adjusted to produce a transmission null. The additional negative resistance element 25–1, connected to the common link 23 of the hybrid to provide added gain, may be omitted. Another configuration that achieves the results of the hybrid in FIG. 9 with enhanced isolation is shown in FIG. 10.

Since but a single Hall plate is employed for each of the devices discussed and since negative impedance elements are essential to the operation, it is desirable to fabricate the entire device as a single unit. Indium antimonide not only is satisfactory as a Hall plate, but also is adaptable to the formation of negative resistance diodes of the Esaki type. For each required negative resistance a p-n junction is both disposed on the plate and biased according to the teachings of the copending application of W. J. Grubbs et al., filed August 16, 1960.

Since the Hall effect is limited only by the dielectric relaxation frequency of its plate and Esaki diode operation depends only upon majority carriers, the resulting devices are operable in the kilomegacycle range.

Other iterations of negative resistance elements in the realization of multistage Hall devices will occur to those skilled in the art. Also apparent will be various ways of using iterated devices.

What is claimed is:

1. A signal amplifier comprising
a single body of Hall-effect material having two principal faces and an edge,
means for applying to said body a magnetic field perpendicular to said principal faces of said body,
an input terminal affixed to a first distinct region on the edge of said body,
an output terminal affixed to a second distinct region on the edge of said body,
a common terminal, and
a plurality of negative resistance elements for increasing the unidirectional gain of said body so that said gain is equal to the gain obtained from multiple bodies of Hall-effect material connected in tandem, wherein each negative resistance element is connected between said common terminal and a separate one of a corresponding plurality of distinct regions on the edge of said body.

2. Apparatus for increasing the gain of a unidirectional signal amplifier which comprises a single body of Hall-effect material provided with an input lead and an output lead respectively attached to first and second distinct regions on said Hall-effect body, a common terminal, and a first set of $n$ negative resistance means, each of said negative resistance means connecting a corresponding one of a third through a $(2+n)$th distinct region on said Hall-effect body with said common terminal, where $n$ is a predetermined positive integer greater than unity.

3. Apparatus as described in claim 2 in combination with means for applying a selected magnetic field to said Hall-effect body.

4. Apparatus as described in claim 2 in combination with a second set of $n$ negative resistance means for providing isolation, the first one of said second set of $n$ negative resistance means connecting said first distinct region with said third distinct region on said Hall-effect body and the $i^{th}$ one of said second set of $n$ negative resistance means connecting the $(2+i)$th distinct region on said Hall-effect body with a $(1+i+n)$th distinct region on said body, where $i$ is a positive integer greater than one and less than or equal to $n$.

5. Apparatus as described in claim 2 in combination with a first and a second negative resistance means respectively included in said input and said output leads.

6. A unidirectional signal amplifier which comprises
a single body of Hall-effect material,
an input terminal, an output terminal, a common terminal,
four negative resistance means for increasing the unidirectional gain of said body of Hall-effect material so that said gain is on the order of the gain obtained from tandem-connected multiple bodies of Hall-effect material, including a first negative resistance means connecting said input terminal to a first distinct region on said body,
a second negative resistance means connecting a second distinct region on said body to a third distinct region on said body,
a fourth distinct region on said body to which is attached said output terminal, and
a third negative resistance means and a fourth negative resistance means connecting respectively a fifth distinct region and a sixth distinct region on said body to said common terminal.

7. A unidirectional signal amplifier which comprises
a single body of Hall-effect material,
an input terminal, an output terminal, and a common terminal, said input terminal and said output terminal being respectively connected to first and second distinct regions on said body, and
$n$ negative resistance means for increasing the unidirectional gain of said body so that said gain is on the order of the gain obtained from multiple bodies of Hall-effect material connected in tandem, wherein the first of said $n$ negative resistance means interconnects said first distinct region with said common terminal, and the $i^{th}$ of said $n$ negative resistance means interconnects an $(i+1)$th distinct region on said body with said common terminal, where $i$ is an integer which is greater than one and less than or equal to $n$.

8. A unidirectional signal amplifier which comprises
a single body of Hall-effect material, an input terminal, an output terminal, and a common terminal respectively connected to a first, a second, and a third distinct region on the surface of said body, a first set of $n$ negative resistance means for increasing the unidirectional gain of said body so that said gain is on the order of the gain obtained from multiple bodies of Hall-effect material connected in tandem, wherein the first of said plurality of $n$ negative resistance means interconnects said first distinct region with a fourth distinct region on the surface of said body, wherein the $i^{th}$ of said plurality of negative resistance means interconnects said $(2+i)$th distinct region with a $(3+i)$th distinct region, and wherein the $n^{th}$ of said negative resistance means interconnects said $(2+n)$th distinct region with said second distinct region, where $n$ is a positive integer greater than one and $i$ is a positive integer greater than one but less than $n$.

9. A signal amplifier as described in claim 8 in combination with a second set of $n$ negative resistance means for decreasing the input impedance of said amplifier, the first of said second set of $n$ negative resistance means interconnecting said common terminal with said fourth distinct region on said body, the $i^{th}$ of said second set of $n$ negative resistance means interconnecting said common terminal with said $(3+i)$th distinct region on said body, and the $n^{th}$ of said second set of $n$ negative resistance means interconnecting said common terminal with said second distinct region on said body, where $i$ is a whole number greater than one but less than $n$.

10. Four-terminal apparatus for the unilateral conduction and amplification of signals between selected pairs of terminals comprising a single body of Hall-effect material, an input terminal connected to said Hall-effect body at a first distinctive region, a first negative resistance means having a first terminal connected to said Hall-effect body at said first distinctive region and a second terminal connected to said Hall-effect body at a second distinctive region adjoining said first distinctive region, a second negative resistance means having a first terminal connected to said Hall-effect body at said second distinctive region and a second terminal connected to said Hall-effect body at a third distinctive region adjoining said second distinctive region, an output terminal connected to said Hall-effect body at said third distinctive region through a first positive resistance means, a common terminal connected to said Hall-effect body at a fourth distinctive region adjoining said first distinctive region, a second positive resistance means having a first terminal connected to said output terminal and a second terminal connected to said Hall-effect body at a fifth distinctive region adjoining said third distinctive region, a third negative resistance means having a first terminal connected to said Hall-effect body at said fifth distinctive region and a second terminal connected to said Hall-effect body at a sixth distinctive region adjoining said fifth distinctive region, a fourth negative resistance means having a first terminal connected to said Hall-effect body at said second distinctive region and a second terminal connected to said common terminal, an auxiliary terminal connected to said Hall-effect body at said second distinctive region, and a conducting path extending from said Hall-effect body at said first distinctive region to said Hall-effect body at said sixth distinctive region.

References Cited by the Examiner
UNITED STATES PATENTS

| 2,775,658 | 12/1956 | Mason et al. | 330—6 |
| 2,794,864 | 6/1957 | Shockley | 330—6 |

ROY LAKE, *Primary Examiner.*

NATHAN KAUFMAN, *Examiner.*